Sept. 22, 1931.    R. D. GEORGE    1,823,935
VALVE OPERATING MECHANISM FOR TANKS
Filed April 18, 1924    2 Sheets-Sheet 1

INVENTOR
Ralph D. George
BY
ATTORNEY

Sept. 22, 1931.  R. D. GEORGE  1,823,935
VALVE OPERATING MECHANISM FOR TANKS
Filed April 18, 1924   2 Sheets-Sheet 2

Patented Sept. 22, 1931

1,823,935

UNITED STATES PATENT OFFICE

RALPH D. GEORGE, OF KANSAS CITY, MISSOURI, ASSIGNOR TO ANDREW A. KRAMER, OF KANSAS CITY, MISSOURI

VALVE OPERATING MECHANISM FOR TANKS

Application filed April 18, 1924. Serial No. 707,409.

This invention relates to tanks of the type adapted to be mounted on the chassis of a motor propelled vehicle and to be used in dispensing volatile liquids such as gasoline. The invention has reference more particularly to the mechanism for operating the valves controlling the outlet of the liquid from the tank and is directed to the provision of an improved valve-operating mechanism which is convenient to operate and of simple construction and with which the factor of safety in dealing with such a liquid as gasoline is greatly increased.

In the construction of tanks for this purpose, it has heretofore been proposed to divide a tank body by suitable transverse partition plates into a plurality of separate tank compartments and to provide a separate outlet for each of these compartments with a conduit leading from each outlet to the rear of the tank where a compartment may be provided for housing the cans used in dispensing the liquid and also the faucets on the ends of the outlet pipes.

This invention relates to such a compartment type of tank having a separate outlet for each compartment and valves controlling these several outlets. In accordance with the invention, a valve mechanism is provided whereby any one of the several valves may be selected and operated independently of all others to permit the flow of gasoline from any desired one of the several compartments and this valve mechanism is so constructed that it may be operated from a position at the rear of the tank.

In accordance with the common practice, when the vehicle stops at a station where gasoline is to be delivered, the operator goes to a position at the rear of the tank where the cans are stored and where the faucets may be operated. The valve mechanism for operating any selected one of the several valves controlling the outlets from the compartment is so arranged that it can be actuated by the operator while standing in this position at the rear of the tank. While in that position he may manipulate the mechanism to select that one of the several compartment valves which he wishes to operate and further manipulate it to open the selected valve.

Such a valve operating mechanism may be combined with other elements of the structure to substantially decrease the dangers incident to dispensing volatile liquids from tank cars. For instance, some part of the valve mechanism may be so arranged with reference to the door or doors of the compartment at the rear of the tank structure as to insure that all of the compartment valves will be closed when the door of the rear compartment is closed, for it is a fact that the operator of such a vehicle may neglect to close the compartment valves before starting the vehicle in motion to travel to the next dispensing station but will seldom or never neglect to close the rear compartment in which the cans and other pieces of apparatus are stored.

One means by which this end may be accomplished is to so arrange some member of the valve operating mechanism that, when any compartment valve is open, it will project into the path of movement of the door of the rear compartment, as a result of which it will be necessary for the operator to close all valves before he can close the compartment door.

A further element of safety may be introduced by the provision of means whereby, in a case of emergency, any compartment valve which is open may be closed from a position at the front of the vehicle. For instance, if a fire at the rear end of the vehicle made it impossible for the operator to approach the handle ordinarily employed in opening and closing a selected valve, he could still close any valve which is open by resort to the emergency means at the forward end of the vehicle.

In the preferred embodiment of the invention in which the several compartments of the tank are provided with outlets at the bottom thereof, the valves controlling the flow through these outlets are within the tank compartments and at the bottom thereof and are forced to their seats by springs. Each valve is mounted upon a stem which extends upwardly across the tank compartment and through an opening in the top wall of the compartment. The valve operating mechanism is arranged to cooperate with these upper ends of the stems of the valves where they project above the top wall of the tank. This valve operating mechanism may be manipulated from a point at the rear of the tank to effect connection to any one of these valve stems and at the same time disconnect from all of the other stems so that one only of the several valves is then in condition to be operated by the mechanism to open the valve. The means for accomplishing this may vary over a wide range but one form of apparatus well adapted for the purpose involves the provision of a shaft extending lengthwise of the tank along the top thereof and in proximity to the projecting upper ends of the valve stems, this shaft being adapted to be moved both axially and rotationally in its bearings by means of an operating handle located at the rear of the tank; one or the other of the rotational and axial movements of the shaft may be employed to select the valve which is to be opened by effecting connection to the stem of that valve and at the same time disconnecting from the others, and the other of the two movements of the shaft may be employed for opening the selected valve.

In such a valve operating mechanism as that above outlined, provision must be made for holding any valve which has been opened in the open position against the tension of the spring employed for forcing it to its seat. This may consist of a suitable latch co-acting with the operating handle of the valve mechanism to hold it in the position to which it has been moved in opening a valve and the safety factors above referred to may be introduced by causing the movement of the door of the rear compartment or the movement of the emergency handle at the front end of the tank to effect the release of this latch, whereupon any valve then open will be closed by its spring.

The details of the preferred embodiment of my invention will be apparent by reference to the following description in connection with the accompanying drawings, in which.

Figure 1:
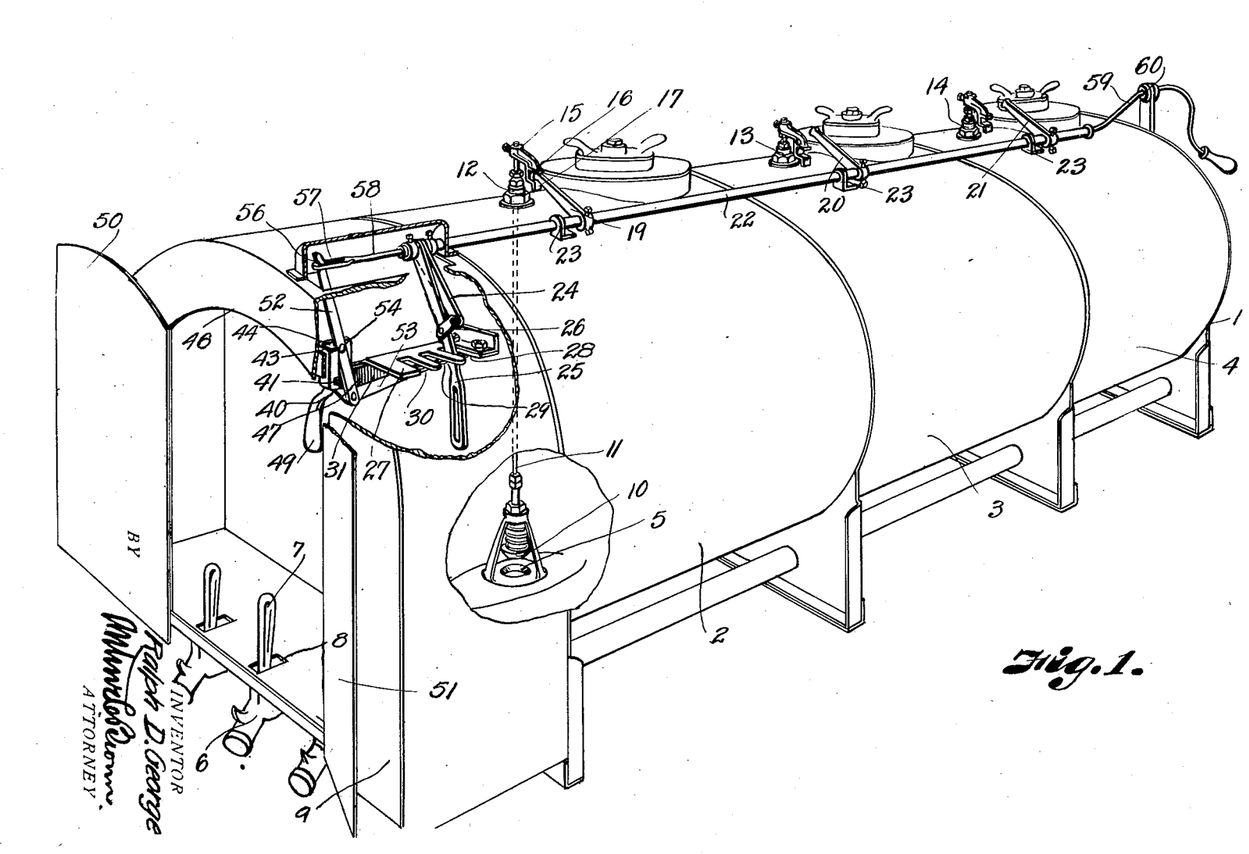
Fig. 1 is a perspective view of a wagon tank constructed in accordance with my invention with part of the can rack being broken away.

The tank 1, is shown as constructed with three compartments 2, 3 and 4 in the usual way, it being obvious however that the exact number of compartments is immaterial. Each compartment is provided with an outlet opening 5 in its bottom to supply oil to one of the valves 6 controlled by a handle 7 projecting through the slot 8 in the bottom of the can rack or box 9. Each opening 5 is adapted to be normally closed by a spring actuated valve 10 on a stem 11 projecting through a stuffing box, as for example 12, 13 and 14 at the top of the tank. The construction thus far described is common to tanks in use prior to my invention but my invention contemplates the provision of means for controlling the valves through the mediums of the stems which project exteriorly of the tank 1.

Figures 2, 3, 4:
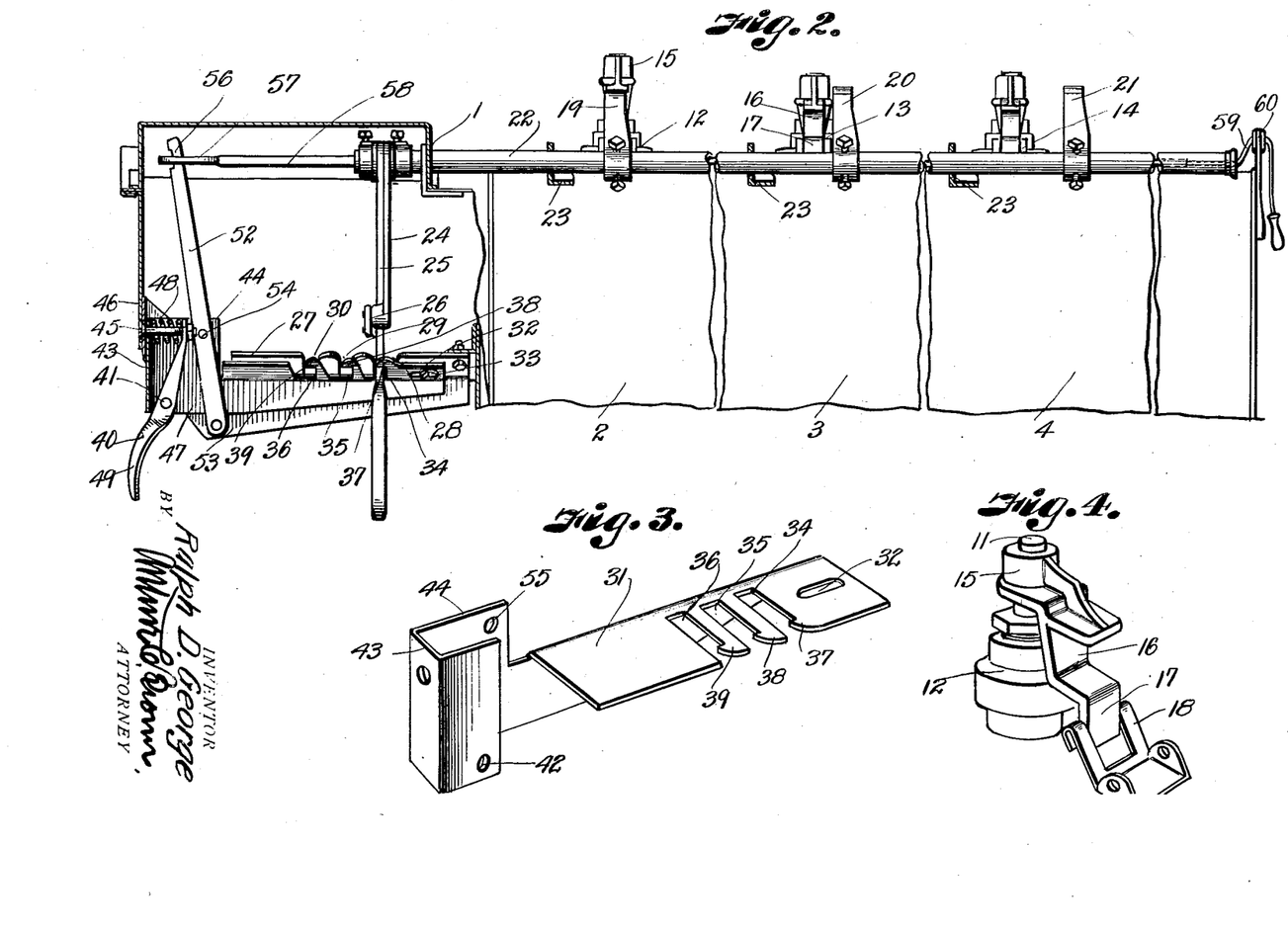
Fig. 2 is an elevational view of the valve operating mechanism.
Fig. 3 is a detailed perspective view of the locking lever engaging slide.
Fig. 4 is a detailed perspective view of one of the valve stem heads.

In Fig. 4 I have illustrated in detail one of the slotted heads on the end of one of the stems, it being understood that each head on each stem is a counterpart of the others. Assuming that the stem 11 in Fig. 4 projects through the stuffing box 12 and that it, as well as all the other stems carry an actuating head, I will now proceed to describe in detail the construction of the preferred form of it. Each head has a collar 15 fast on its stem 11 and it is provided with a jaw 16 to receive a lever arm to be hereinafter described. The jaw has a depending portion 17 located between a bifurcated guide and stop member 18 which may be welded or otherwise secured to the tank so that the jaw may have a vertical movement to raise and lower the stem 11, but due to the guide 18, the jaw will be held against lateral swinging. Therefore the jaw 16 will always be in position to receive one of the actuating levers 19, 20 or 21 on the hollow rock shaft 22 mounted in bearings 23 on the tank and adapted to rock in those bearings and also to be moved axially an amount sufficient to carry any one of the arms 19, 20 and 21 into co-action with jaws 16 on the lever 15 of the corresponding valve and the other two arms out of co-action with their corresponding valve levers. The hollow rock shaft may in practice consist of a piece of pipe and at one end of the pipe is rigidly secured a rocking link arm 24 connected to the locking arm 25 by a fusible link 26. The locking arm 25 is mounted on the hollow shaft or pipe 22 but it is adapted to swing or have loose connection with the pipe 22 when the link is fused, therefore the arm 25 will maintain its relative rigidity with respect to the pipe 22 just so long as it is connected to the arm 24 through the medium of the fusible link 26. When however the link 26 is fused, the connection by the arms 24 and 25 will be broken, then the rock shaft 22 may rotate or rock independent of the locking arm 25. The locking arm is adapted to engage any one of a plurality of slots in the plate 27. The plate 27 is rigidly fastened to the can rack or to the end of the tank and it is shown as provided with slots 28, 29 and 30 to receive the locking arm. When the locking arm is in the slot 28, the rocker arm 19 will be in the jaw 16 of the head on the end of the shaft 11 which projects through the stuffing box 12.

When the arm 25 is in the slot 29, the rocking arm 20 will be in the jaw 16 on the stem 11 which projects through stuffing box 13. When the locking arm 25 is in the slot 30, the arm 21 will be in the jaw 16 on the stem 11 which projects through stuffing box 14. Therefore if the rock shaft 22 is moved longitudinally in the bearings 23, any one of the three arms 19, 20 or 21 may be brought into register with the jaw 16 for the respective compartments 2, 3 and 4 and by pressing down upon the lower end of the locking arm 25, the rock shaft 22 will be turned to raise from its seat the valve 10 of the compartment selected by the longitudinal movement of shaft 22 effected by arm 25. Of course some means must be provided for holding the locking arm in the slot into which it is moved, that is in one of the slots 28, 29, or 30, since otherwise the spring 10 would close the valve.

In order to provide an inexpensive means for holding the locking lever on the arm in the selected slot, I provide a detent plate, best shown in detail in Fig. 3. The detent plate 31 is provided at one end with an elongated guide slot 32 through which a bolt 33 projects with a washer for supporting one end of the plate. The plate is provided with slots 34, 35 and 36 corresponding to the slots 28, 29 and 30 and adapted to register therewith. The edges of the slots 34, 35 and 36 are provided with detents 37, 38 and 39 adapted when the plate 31 is moved in one direction to close the slots 28, 29 and 30 so that whenever the plate 31 is moved in one direction, it will be effective in holding and retaining the locking arm in its selected slot, but whenever the plate is moved in an opposite direction and the end of the slot containing the locking lever or arm 25 is unobstructed, then the spring 10 which is under compression, due to the fact that its stem is raised, will be effective in closing its valve, rocking the shaft 22 and moving the arm 25 out of its previously selected slot.

The locking plate 31, as heretofore explained, is supported at one end by the washer on the end of the bolt 33. The other end of the plate 31 is connected to a release lever 40. The release lever 40 has a pivot 41 which passes through aligning openings 42 in the angle portion 43 on the end of the plate 31. In Fig. 3 there is only one opening 42 shown, but the back plate 44 has a similar opening to receive the pivot pin 41 as will be readily understood. The lever 40 is suspended on a bolt 45 which is rigid with the flange 46 of the can rack, so inasmuch as the lever 40 is hung on the hanger pin 45 and inasmuch as it is pivotally connected at 41 to the flange 42 of the plate 31, it will be apparent that the rear end of the plate is supported by the member 40 and the front by the washer on bolt 33.

The toe or upper portion of the lever 40 is urged forward by a spring 48 so that it tends to throw the heel 49 of the lever 40 rearwardly, as a result of which the detents 37, 38, 39 are moved across the slots 28, 29 and 30. When the doors 50 and 51 of the can rack 9 swing closed so that pressure is applied to the heel 49, then the fulcrum of the lever is at the toe portion in front of spring 48. Therefore the pivot 41 will move forward, carrying the plate 31 with it and moving the detents 37, 38 and 39 away from the entrances to the slots 34, 35 and 36.

The advantage of the construction just described is that in the event that one of the arms 19, 20 or 21 is engaging a jaw 16 so as to hold one of the stems 11 in raised position to unseat a valve 10, there will be a flow from the tank to one of the spigot or valves 6 until the arm 25 moves out of its selected slot and in actual practice the drivers of the vehicles not infrequently forget to close off the valve 10. They seldom forget however to close the can rack 9 because the can rack contains the hose, cans, measures and the like, so it will be apparent that since the heel 49 of the lever 40 is in the path of the closing door or doors 50 and 51, when the doors are closed, the detent plate must be moved to releasing position.

It sometimes happens that the oil catches fire at the rear end of the wagon so that the releasing mechanism is not accessible. In order to provide for such a contingency, I have included as part of my invention, means for releasing the locking lever detent plate from a point accessible adjacent to the front of the tank. In order to accomplish this result, I pivot a lever 52 to the flange 53 of plate 27 and also pivot the lever 52 to the back plate 44 by passing a pivot 54 through the lever 52 and through the opening 55. The upper end of the lever is notched as at 56, the notched portion being engaged by a loop 57 on the end of a reciprocatory rod 58 which extends into the hollow shaft or pipe 22 and at the front end of the rod is a cable 59 extending through a guide 60 so that it can be accessible to permit the operator to exert a pull to move the rod 58 longitudinally in a forward direction. This will move the plate 31 in a forward direction because the fulcrum will be at the point that the lever 52 is pivoted to the flange 53, therefore the pivot 54 will be moved forward to slide the detent plat forward to unlocking position, permitting the widths of the slots 28, 29 and 30 to be exposed so that the spring 10 of the valve which is open will pull down on its stem 11 and rock the shaft 22, swinging the locking arm 25 out of its selected slot, and therefore it will be apparent that the valve 10 can be closed from the front of the vehicle in case of danger.

Sometimes fire at the rear end of the tank becomes excessively hot and the attendant may not be present. In that event the fusible link 26 will fuse, then the arm 24 which is rigid on the hollow shaft 22 will become detached from the arm 25 and the force of the spring 10 will be sufficient to rotate the shaft 22 and arm 24, thus seating the valve which had been opened and shutting off the supply of oil passing through opening 5. The danger of the continuance of the conflagration will thus be materially lessened.

Attention is called to the fact that the locking bar 25 also serves the purpose of a selector bar, movable in any one of the slots 28, 29 or 30, and thus bring the selected arm 19, 20 or 21 into functional position. For example when the arm 25 is in the slot 28, the valve in compartment 2 will be the one raised. When the arm is in slot 29, the valve in compartment 3 will be raised and when the arm is in slot 30, the valve in compartment 4 will be raised. It will be apparent that the detents are so formed that the arm can ride on the outer cam edges to move into any one slot, but it cannot be disengaged from the slot unless one of the several releasing mechanisms is operated. The mechanism can be readily constructed and applied to existing types of so-called wagon or motor vehicle dispensing tanks.

What I claim and desire to secure by Letters-Patent is:

1. In combination, a compartmental tank having outlet openings in the compartments, spring pressed valves for closing the opening and means for unseating the valves, said means consisting of a rock shaft, valve unseating arms on the rock shaft, a selector plate having selector slots, a locking arm receivable in any one of the several slots in the selector plate, the arm being connected to the rock shaft and adapted to swing it so as to unseat one of the valves against the action of its spring, a detent normally urged in position to close the slot in which the locking arm is received to hold the locking arm in functional position and a spring pressed lever connected to the detent and adapted to move the detent out of slot obstructing position to permit the springs of the spring pressed valve to close the valve on its seat.

2. A valve operating mechanism for compartmental tanks, said mechanism comprising a slidable rock shaft having valve stem actuating arms, an arm loose on the rock shaft, a fusible connection holding the arm rigid with the rock shaft, a selector plate having slots, any one of which is adapted to receive the arm and a slidable detent for holding the arm in a selected slot.

3. A valve operating mechanism for compartmental tanks, said mechanism comprising a slidable rock shaft having valve stem actuating arms, an arm loose on the rock shaft, a fusible connection holding the arm rigid with the rock shaft, a selector plate having slots, any one of which is adapted to receive the arm, a slidable detent for holding the arm in a selected slot and spring pressed means for moving the detent to releasing position.

4. A valve operating mechanism for compartmental tanks, said mechanism comprising a slidable rock shaft having valve stem actuating arms, an arm loose on the rock shaft, a fusible connection holding the arm rigid with the rock shaft, a selector plate having slots, any one of which is adapted to receive the arm, a slidable detent for holding the arm in a selected slot and spring pressed means for moving the detent to releasing position, said spring pressed means being actuatable from either end of the mechanism.

5. In a device of the class described, a longitudinally slidable rock shaft having valve operating arms, a rock shaft actuating arm on one end of the rock shaft, plates having relative horizontal longitudinal sliding movement, one of said plates having a slot to receive the actuating arm and the other having a detent for holding the arm in the slot of the complementary plate, means for causing horizontal longitudinal relative movement between the plates to release the actuating arm.

6. In a wagon tank having compartments with spring pressed valves for the outlets in the bottom of the compartments provided with stems extending to the tops of the compartments and conduits leading from the outlets to the back ends of the tank construction, a box having a door, a valve operating mechanism comprising a rock shaft, mounted to slide upon the body of the tank, heads on the stem provided with jaws, valve lift arms on the rock shaft to be selectively moved to engage the jaws by shifting the rock shaft, an actuating arm on the rock shaft, a member having selector slots to receive the actuator arm in the slots in which it is received and means actuated by the door of the can box when in closed position for releasing said actuator arm by moving the detent.

7. In a wagon tank having compartments with spring pressed valves for the outlets in the bottom of the compartments provided with stems extending to the tops of the compartments and conduits leading from the outlets to the back end of the tank construction, a box having a door, a valve operating mechanism comprising a rock shaft, mounted to slide upon the body of the tank, heads on the stems provided with jaws, valve lift arms on the rock shaft to be selectively moved to engage the jaws by shifting the rock shaft, an actuating arm on the rock shaft, a member having selector slots to receive the actuator arm in the slots in which it is received and means actuated by a door of the can box when in closed position for releasing said actuator arm by moving the detent, said means comprising a pivoted lever against which, at least one of the doors of the can box will press when the can box is closed.

8. In a wagon tank having compartments with spring pressed valves for the outlets in the bottom of the compartments provided with stems extending to the tops of the compartments and conduits leading from the outlets to the back end of the tank construction, a box having a door, a valve operating mechanism comprising a rock shaft, mounted to slide upon the body of the tank, heads on the stems provided with jaws, valve lift arms on the rock shaft to be selectively moved to engage the jaws by shifting the rock shaft, an actuating arm on the rock shaft, a member having selector slots to receive the actuator arm in the slots in which it is received and means actuated by the door of the can box when in closed position for releasing said actuator arm by moving the detent, and additional means for releasing the detent, said means comprising a lever connected to the detent, an actuating handle at the front end of the rock shaft and a connector between the lever and the actuating means extending through the rock shaft.

9. A tank divided by partition plates to form a plurality of tank compartments arranged in line and each having an outlet at the bottom thereof, a valve in each compartment controlling the outlet therefrom, a stem for each valve extending upwardly therefrom through the top wall of the compartment of that valve, and a valve operating mechanism, coacting with the upper ends of said stems and including an operating member located at the rear of the tank, operable to select any one of the several valves to be opened and to open the selected valve and means for locking the valve operating mechanism with a selected valve open.

10. A tank divided by partition plates into a plurality of tank compartments each provided with an outlet at the bottom thereof, a valve in each of the compartments controlling the outlet therefrom, a spring for closing each valve, a stem for each valve extending upwardly therefrom through the top wall of the compartment of that valve and a valve mechanism including a shaft extending along the top of the tank in proximity to the several valve stems and an operating member at the rear of the tank coacting with said shaft, said valve mechanism being operable to select any one of the several valves which is to be opened and to open the selected valve.

11. A tank divided into a plurality of tank compartments each having an outlet opening, spring-closed valves each controlling the outlet from a compartment and a valve mechanism for controlling the several valves including a shaft extending lengthwise of the tank and movable both axially and rotationally in bearings to select any one of the several valves and to open the selected valve, and means for actuating shaft located at the rear end of the tank, and means for securing the shaft in position with a selected valve open.

12. A tank comprising a plurality of tank compartments each having an outlet, spring-closed valves controlling the outlets from the several compartments, a valve-operating mechanism adapted to be actuated from a position at the rear of the tank to make connection to any selected one of the several valves and to open the selected valve, and means for securing the valve operating mechanism in position with a selected valve open.

13. A tank comprising a plurality of tank compartments each having an outlet at the botom thereof, valves in the several compartments controlling the outlets therefrom, springs for moving the valves toward their seats, stems for the several valves each extending upwardly from its valve through the top wall of the compartment controlled by that valve, a valve operating mechanism adapted to be actuated from the rear of the tank to connect it to the stem of a selected valve and disconnect it from all of the other valve stems and to actuate the selected valve to open it against the tension of its spring, and means for securing the valve operating mechanism in position with a selected valve open.

14. A tank divided into a plurality of tank compartments each provided with an outlet opening, spring-actuated valves each controlling the outlet from one of the compartments, a shaft extending lengthwise of the tank and movable in one direction to effect connection to any one of the several valves and disconnect all other valves, means located at the rear of the tank for moving the shaft in said direction and also in another direction to actuate the valve to which it is then connected, and means for securing the shaft in position with a selected valve open.

15. A tank divided into a plurality of tank compartments each provided with an outlet, valves controlling the outlets from the several compartments, springs for moving the valves to their closed positions, a valve mechanism operable from a position at the rear of the tank to select any one of the several valves and to open the selected valve, a locking device for holding the valve operating mechanism in position with the selected valve open and means responsive to a predetermined temperature for releasing the locking means.

16. A tank divided into a plurality of tank compartments each having an outlet opening, valves controlling the outlets from the several compartments, a valve mechanism operable from a position at the rear of the tank for selecting any one of the several valves and for opening the selected valve, means for holding the valve mechanism in position with a selected valve open and emergency means located at the front end of the tank for effecting the release of a valve which has been opened.

17. A tank divided into a plurality of tank compartments each having an outlet opening, valves controlling the outlets from the several tanks, a valve operating mechanism operable from a position at the rear of the tank for selecting any one of the several valves and opening the selected valve, a compartment at the rear of the tank provided with a door and an interlock between the door and the valve operating mechanism precluding closing of the door except when all of the valves are closed.

18. A tank divided into a plurality of compartments, each provided with an outlet opening, valves controlling the outlets from several compartments, a spring for each valve for moving it to the closed position, a valve operating mechanism operable from a position at the rear of the tank for selecting any one of the several valves and moving the selected valve to its open position, means for holding the valve operating mechanism in position with the selected valve open, a compartment at the rear of the tank provided with a door and means co-acting with the said door for releasing the said locking mechanism to allow any valve in the open position to be moved to the closed position by its spring and thereby insure the closing of all valves when the said door is closed.

19. A tank divided into a plurality of tank compartments each provided with an outlet opening, valves in the several compartments for controlling the outlet openings thereof, a stem for each valve extending upwardly therethrough through the top wall of the compartment, a shaft extending lengthwise of the tank in proximity to the upper ends of the valve stems and movable both axially and rotationally, means located at the rear end of the tank for moving the shaft to effect connection thereof to one of the several stems and disconnect it from all others, and for moving the shaft to actuate the valve to whose stem it is then connected, and means for securing said shaft in actuated position with a selected valve open.

20. In combination with a tank having a plurality of outlets of spring-closed valves controlling said outlets, valve operating means connected with each of said valves for effecting opening thereof, operating mechanism for said valve operating means whereby to select a valve open and said selected valve comprising a single shaft and a thermal device enabling said shaft to move whereby to close the selected valve.

21. In combination with a number of tank chambers and valve devices pertaining to said chambers, a control rod movable both lengthwise and turnably, and instrumentalities set in different relative positions along said rod, whereby one movement of the rod serves to select a valve device for actuation while the other movement causes the actuation, selecting and actuating means operatively connected with the rear portion of said rod for operating the same in the manner described, and a device operable from the forward end of the tank to bring about a movement of the rod, in order to release the actuated valve device.

22. In combination with a vehicle, a series of tanks carried by said vehicle, an outlet pipe extending from each of said tanks to the rear of said vehicle, self-closing valves in each of said pipes and means including a cam for opening and keeping open one valve only, at one time, said means being releasable from two positions, one of said positions being removed from the other.

23. In a tank vehicle, the combination of a tank having a plurality of compartments for liquid, each compartment having an outlet, valves for controlling the flow of liquid through individual outlets, operating means connected with each of said valves for effecting opening and closing thereof, operating mechanism for said valve-operating means whereby to select a valve, open said valve and hold open said valve, this mechanism including a shaft capable of being moved to a position in which it holds a selected valve open, and a thermal device operative to bring about the movement of the shaft to another position, whereby the valve is closed.

24. In a tank vehicle, the combination of a tank having a plurality of compartments for liquid, each compartment having an outlet, valves for controlling the flow of liquid through individual outlets, operating means connected with each of said valves for effecting opening and closing thereof, this means including a member associated with each valve operatively connected to the valve stem, operating mechanism for said valve operating means whereby to select one of said valves and open said selected valve only including a shaft and means for establishing an operative connection between the shaft and the member associated with a selected valve, said shaft being movable to a position in which the selected valve is held open by its member, and a thermal device operative to bring about movement of the shaft to another position whereby the valve is closed.

25. In a tank vehicle, the combination of a tank divided by partition plates to form a plurality of liquid compartments arranged in line and each having an outlet, a valve in each compartment controlling the flow of liquid through the outlet, a stem for each valve extending upwardly therefrom through the top wall of the compartment of the valve, conduit means for delivering liquid from the outlets to the rear end of the tank, and a valve operating mechanism for selecting a valve and opening and locking open said selected valve only including a shaft extending lengthwise of the tank, means disposed at intervals along the shaft by which the stem of a selected valve may be connected to the shaft mechanically to partake of the movement thereof and an operating member for the shaft disposed at the rear of the tank.

26. In a tank vehicle, the combination of a tank divided by partition plates to form a plurality of liquid compartments arranged in line and each having an outlet therefrom, a valve in each compartment controlling the flow of liquid through the outlet, a stem for each valve extending upwardly therefrom through the top wall of the compartment of the valve, these valve stems being arranged in a row extending lengthwise of the tank, and a valve operating mechanism for selecting one of said valves and opening and locking open said selected valve only including a shaft extending lengthwise of the tank at one side of the row of valve stems, means disposed at intervals along the shaft and extending between the shaft and the row of valve stems by which the stem of a selected valve may be connected mechanically to the shaft to partake of the movement thereof and an operating member for the shaft disposed at the rear of the tank.

27. In a tank vehicle, the combination of a tank subdivided by partition plates to form a plurality of liquid compartments arranged in line and each having an outlet therefrom, a valve in each compartment controlling the flow of liquid through the outlet, each valve having a stem extending upwardly therefrom through the top wall of the compartment, these stems being arranged in a row extending lengthwise of the tank, and a valve operating mechanism for selecting one of said valves and opening and locking open said selected valve only including a shaft mounted on the tank and extending lengthwise of the tank at one side of the row of valve stems and spaced therefrom, means disposed at intervals along the shaft, and extending between the shaft and the row of valve stems by which the stem of a selected valve may be connected mechanically to the shaft to partake of movement thereof, and an operating member for the shaft disposed at the rear of the tank.

28. In combination with a number of tank chambers and valve devices pertaining to said chambers, a control rod movable both lengthwise and turnably, dogs set in different relative positions along said rod, whereby one movement of the rod brings one or another of said dogs into position to act upon the corresponding valve device, while the other movement of the rod causes the dog to actuate said device, and means operable to lock said rod in any of its positions of actuation.

29. In a tank vehicle, the combination of a tank subdivided by partitions to form a plurality of compartments having individual outlets, valve devices for the separate compartments including a valve in each compartment having a stem projecting through the top wall of the compartment, means connected with the stem of each valve by which the valve can be operated, a control rod extending lengthwise of the tank and movable longitudinally and rotatably, this rod carrying devices disposed in different relative positions along the rod and adapted to be operatively connected with said means whereby one movement of the rod serves to select a valve for actuation, while the other movement causes the actuation of the selected valve, and means cooperating with said rod and operable to lock it in any of its positions of actuation.

30. In a tank vehicle, the combination of a tank subdivided by partitions to form a plurality of compartments having individual outlets, valve devices for controlling the separate outlets, a control rod movable both lengthwise and turnably, instrumentalities set in different relative positions along said rod whereby one movement of the rod serves to select a valve device for actuation, while the other movement causes the actuation, and means for securing the rod in position with a selected valve open.

31. In a tank vehicle, the combination of a tank subdivided by partitions to form a plurality of compartments having individual outlets, valve devices for controlling the separate outlets, a control rod movable both lengthwise and turnably, instrumentalities set in different relative positions along said rod whereby one movement of the rod serves to select a valve device for actuation, while the other movement causes the actuation, a member for operating the rod, and means by which this member may be secured in position with a selected valve open.

32. In a tank vehicle, the combination of a tank subdivided by partitions to form a plurality of compartments having individual outlets, valves for controlling separate outlets, each valve having a stem projecting above the top wall of its compartment, springs for effecting closing of the valves, means connected with the stem of each valve by which that valve may be operated, a control rod movable both lengthwise and turnably, devices set in different relative positions along said rod and adapted to establish operative connections between the rod and the valve-operating means whereby one movement of the rod serves to select a valve for actuation while the other movement causes the actuation, selecting and actuating means operatively connected with the rod at one point for operating the mechanism in the manner described, and a device operable at a point remote from the selecting and actuating means for bringing about a movement of the rod by which the connection between the rod and the open valve is broken.

33. In combination with a number of tank chambers and valve devices pertaining to said chambers, a control rod movable both lengthwise and turnably, instrumentalities set in different relative positions along said rod, whereby one movement of the rod serves to select a valve device for actuation and the other movement causes said actuation, selecting and actuating means operatively connected with one portion of said rod for operating the same in the manner described, means for locking the rod in position with a selected valve open and a device operable at a point remote from the selecting and actuating means capable of bringing about the movement of the rod to inoperative position, whereby to release the actuated valve device.

34. In a tank vehicle, the combination of a tank subdivided by partitions to form a plurality of compartments having individual outlets, valve devices for controlling the said outlets, a control rod movable both lengthwise and turnably, instrumentalities set in different relative positions along said rod whereby one movement of the rod serves to select a valve device for actuation while the other movement causes the actuation, means for holding the rod in position with a selected valve open, and a thermal device operative upon exposure to a predetermined temperature to render the said holding means ineffective.

35. In a tank vehicle, the combination of a tank subdivided by partitions to form a plurality of compartments having individual outlets, valves for the separate compartments for controlling the outlets therefrom and provided with means normally holding the valves closed, a control rod movable both lengthwise and turnably, devices set in different relative positions along said rod, whereby one movement of the rod serves to select a valve for actuation, while the other movement causes the actuation through the said instrumentalities, means for holding the control rod in position with a selected valve open, and a thermal device operative upon exposure to a predetermined temperature for rendering said holding means ineffective, whereby said valve-closing means close the open valves.

36. A tank divided into a plurality of compartments each having an outlet opening, a valve associated with each compartment for controlling the flow therefrom through its outlet, a valve mechanism operable from a point near one end of the tank for selecting any one of the several valves and for opening the selected valve, said mechanism including a locking device for holding the mechanism actuated with said selected valve open, and emergency means operable from a point remote from the valve mechanism for acting on the latter to effect the release of the selected opened valve.

37. A tank divided into a plurality of compartments, each having an outlet opening, a valve associated with each compartment for controlling the flow therefrom through its outlet, a valve mechanism operable from a point near one end of the tank to select one of the valves and open the selected valve, a plurality of springs, one for each valve, arranged in such manner that the force of the spring associated with the selected valve must be overcome before that valve can be opened, means for holding the valve mechanism in position with a selected valve open, and emergency means operable from the other end of the tank for effecting the release of a valve which has been opened.

38. In combination with a vehicle, a series of tanks carried by said vehicle, each having an outlet, a separate pipe extending from each outlet to the rear of said vehicle, a self-closing valve arranged to control flow from each tank through its associated outlet pipe, means for opening and keeping open one valve only at a time including a shaft disposed independently of said outlet pipes and arranged for lengthwise and turning movement, a cam mounted on the shaft, and means operatively connected to the stem of said valve and adapted to be actuated by the cam to open said valve upon operation of said shaft, and means for operating said valve opening means from two positions, remote from each other.

39. In combination with a vehicle, a series of tanks carried by said vehicle, each having a separate outlet, a valve for controlling flow through each outlet, and means for opening and keeping open one valve only at a time including a cam, a member operatively connected to the stem of said valve at a distance from the valve seat, and adapted to be engaged and moved by the cam, said means being releasable from two positions remote from each other.

40. In combination with a vehicle, a series of tanks carried by said vehicle, each having a separate outlet, a valve for controlling flow through each outlet, means for opening and keeping open one valve only at a time including a cam, a member operatively connected to the stem of said valve and adapted to be moved by the cam to open the valve and to be held by the cam in such position, said means being releasable from two positions, one remote from the other, and means responsive to temperature for effecting the release of the opened valve.

41. In combination with a vehicle a series of tanks carried by said vehicle, an outlet pipe leading from each tank to the rear of the vehicle, a self-closing valve arranged to control flow from each tank through its associated outlet pipe, and means for opening and keeping open one valve only at a time, including a cam, a member operatively connected to the stem of said valve at a point remote from the valve seat adapted to be engaged and moved by the cam, a shaft on which the cam is mounted arranged for lengthwise and rocking movement, and means for bringing about a movement of the shaft resulting in the release of said opening means and operable from two positions, one remote from the other.

42. In a tank vehicle, the combination of a tank having a plurality of compartments for liquid, each compartment having an outlet, valves for controlling the flow of liquid through individual outlets, operating means connected with each of said valves for effecting opening and closing thereof, operating mechanism for said valve operating means operable to select any of the valves and to open the selected valve, this mechanism including a shaft capable of being moved to a position in which it holds a selected valve open, and a thermal device operative to bring about the movement of the shaft to another position, whereby the valve is closed.

43. In a tank vehicle, the combination of a tank having a plurality of compartments for liquid, each compartment having an outlet, valves for controlling the flow of liquid through individual outlets, operating means connected with each of said valves for effecting opening and closing thereof, the said means including a member operatively connected to the stem of each valve, operating mechanism for said valve operating means operable to select a valve and to open the selected valve including a shaft and means for establishing an operative connection between the shaft and the member associated with a selected valve, said shaft being movable to a position in which the selected valve is held open by its member, and a thermal device operative to bring about movement of the shaft to another position whereby the valve is closed.

44. In combination with a number of tank chambers and valve devices pertaining to said chambers, a control rod movable both lengthwise and turnably, dogs set in different relative positions along said rod, whereby one movement of the rod brings one or another of said dogs into position to act upon the corresponding valve device, while the other movement of the rod causes the dog to actuate said device, and means operable for locking said valve device in opened position.

45. In a tank vehicle, the combination of a tank subdivided by partitions to form a plurality of compartments having individual outlets, valve devices for the separate compartments including a valve in each compartment having a stem projecting through the top wall of the compartment, means connected with the stem of each valve by which the valve can be operated, a control rod extending lengthwise of the tank and movable longitudinally and rotatably, this rod carrying devices disposed in different relative positions along the rod and adapted to be operatively connected with said means whereby one movement of the rod serves to select a valve for actuation, while the other movement causes the actuation of the selected valve, and means for locking the control rod in poistion with a selected valve actuated.

46. In combination with a number of tank chambers and valve devices pertaining to said chambers, a control rod movable both lengthwise and turnably, instrumentalities set in different relative poistions along said rod, whereby one movement of the rod serves to select a valve device for actuation while the other movement causes the actuation, selecting and actuating means operatively connected with one portion of said rod for operating the same in the manner described, and a device operable at a point remote from the selecting and actuating means for bringing about the movement of the rod from operative to inoperative position, whereby said previously operative instrumentality is rendered inoperative.

47. A tank divided into a plurality of compartments each having an outlet opening, a valve associated with each compartment for controlling flow therefrom through its outlet, a valve operating mechanism operable to select any of the valves and to open the selected valve, this mechanism including a shaft, connections operable selectively for connecting the shaft and the stem of any valve whereby movement of the shaft will be imparted to the valve to cause the valve to be opened, and means at one end of the tank for manipulating the valve operating mechanism to select and open a valve, and means disposed at a distance from the said end of the tank for bringing about a movement of the shaft to inoperative position.

48. In combination with a vehicle, a series of tanks carried by said vehicle, each having an outlet, a valve for controlling flow through each outlet, mechanism for opening and keeping open one valve only at a time including a shaft, a cam on the shaft, and an operating member for moving the shaft in two directions for selecting and actuating purposes respectively, and means for locking the mechanism in position with a selected valve open.

49. A tank divided into a plurality of tank compartments, each having an outlet opening, valves controlling the outlets from the several compartments, valve operating mechanism operable from a position at one end of the tank for selecting any one of the several valves and for opening the selected valve, and means for locking the valve operating mechanism in position with a selected valve open.

50. A tank divided into a plurality of tank compartments, each having an outlet opening, valves controlling the outlets from the several compartments, valve operating mechanism operable from a position at one end of the tank for selecting any one of the several valves and for opening the selected valve, this mechanism including a shaft having a plurality of selecting and operating positions, and means for locking the said mechanism in position with a selected valve open.

51. A tank divided into a plurality of tank compartments, each having an outlet opening, valves controlling the outlets from the several compartments, valve operating mechanism operable from a position at one end of the tank for selecting any one of the several valves and for opening the selected valve, this mechanism including a shaft having a plurality of selecting and operating positions, and a thermal device for rendering said mechanism inoperative.

52. In a tank vehicle, the combination of a plurality of compartments for liquid, each compartment having an outlet, valves for controlling the flow of liquid through individual outlets, individual operating means for each valve including a member operatively associated with the valve, mechanism for selecting any of the valves and for opening the selected valve including a shaft and means thereon for establishing an operative connection between the shaft and the member associated with the selected valve, this shaft having a plurality of selecting and operating positions, and means for locking the shaft with a selected valve open.

53. In a tank vehicle, the combination of a plurality of compartments for liquid, each compartment having an outlet, valves for controlling the flow of liquid through individual outlets, individual operating means for each valve including a member operatively associated with the valve, mechanism for selecting any of the valves and for opening the selected valve including a shaft and means thereon for establishing an operative connection between the shaft and the member associated with the selected valve, this shaft having a plurality of selecting and operating positions, and a thermal device operative when the shaft is in any of its several operating positions for rendering said mechanism inoperative.

54. In a tank vehicle, the combination of a plurality of compartments for liquid, each compartment having an outlet, valves for controlling the flow of liquid through individual outlets, individual operating means for each valve including a member operatively associated with the valve, mechanism for selecting any of the valves and for opening the selected valve including a shaft and means thereon for establishing an operative connection between the shaft and the member associated with the selected valve, this shaft having a plurality of selecting and operating positions, and means for bringing about movement of the shaft to inoperative position, said means being operable from two positions remote from each other.

55. In a vehicle, the combination of a plurality of compartments, each having an outlet, a valve for each outlet for controlling flow therethrough, a shaft extending along the compartments and having elements set in different relative positions thereon for establishing operative connections between the shaft and the valves, means for moving the shaft in one direction to bring an element thereon in position to establish said connection with respect to a selected valve, and for moving the shaft in another direction to actuate said selected valve, means for holding the shaft in position with a selected valve open, and a thermal device responsive to a predetermined temperature for rendering said holding means ineffective.

In testimony whereof I affix my signature.

RALPH D. GEORGE.